(12) United States Patent
Haylock et al.

(10) Patent No.: US 8,647,036 B2
(45) Date of Patent: Feb. 11, 2014

(54) RETAINER RING

(75) Inventors: Luke Haylock, Culver City, CA (US); Frank Cosenza, Santa Barbara, CA (US); Rodrigo Pinheiro, Riverside, CA (US); Edgar Frias, Huntington Beach, CA (US)

(73) Assignee: Alcoa Inc., Pittsburgh, PA (US)

( * ) Notice: Subject to any disclaimer, the term of this patent is extended or adjusted under 35 U.S.C. 154(b) by 160 days.

(21) Appl. No.: 13/157,784

(22) Filed: Jun. 10, 2011

(65) Prior Publication Data

US 2012/0027536 A1 Feb. 2, 2012

Related U.S. Application Data

(60) Provisional application No. 61/397,618, filed on Jun. 14, 2010, provisional application No. 61/397,617, filed on Jun. 14, 2010.

(51) Int. Cl.
*F16B 21/18* (2006.01)

(52) U.S. Cl.
USPC ............................ 411/353; 411/517; 411/521

(58) Field of Classification Search
USPC ......... 411/374, 411, 424, 353, 517, 521, 533, 411/541, 943
See application file for complete search history.

(56) References Cited

U.S. PATENT DOCUMENTS

| | | | |
|---|---|---|---|
| 1,595,054 A * | 8/1926 | Ballou, Jr. ...................... | 411/353 |
| 2,282,360 A * | 5/1942 | Horrocks ....................... | 411/553 |
| 2,865,076 A * | 12/1958 | Newton et al. ................ | 411/347 |
| 3,217,774 A * | 11/1965 | Pelochino ...................... | 411/353 |
| 4,464,090 A | 8/1984 | Duran | |
| 4,844,677 A | 7/1989 | Schwartzman | |
| 5,073,070 A | 12/1991 | Chang | |
| 5,537,844 A | 7/1996 | Maclean | |
| 5,673,920 A * | 10/1997 | Mockenhaupt ................ | 277/630 |

(Continued)

FOREIGN PATENT DOCUMENTS

| FR | 2741916 A1 | 6/1997 |
|---|---|---|
| JP | 635637 | 5/1994 |

OTHER PUBLICATIONS

International Search Report and Written Opinion issued in connection with Applicants' International Application No. PCT/US2011/040295 (10 pages).

(Continued)

*Primary Examiner* — Roberta Delisle
(74) *Attorney, Agent, or Firm* — Greenberg Traurig, LLP (57) ABSTRACT

A retainer ring including an outer ring having an exterior surface, an interior surface, and a plurality of spring beam elements extending inwardly from the interior surface, and a central aperture. Each of the spring beam elements includes an elongated arm having a first end attached to the interior surface of the outer ring and a second, free end opposite the first end. Each of free ends of the arms includes a tab portion and a pressure pad that extends from the tab portion. The retainer ring captivates pin members, such as bolts, onto work pieces, such that the pressure pads engage and align with an annular groove of the bolt. When the bolt engages the retainer ring, each of the spring beam elements is displaced and expands radially from a free position to an expanded position in order to enable the bolt to travel through the aperture. The retainer ring captivates the bolt onto the work piece, while providing a positive hold out of the bolt.

14 Claims, 13 Drawing Sheets

(56) References Cited

U.S. PATENT DOCUMENTS

| | | | | |
|---|---|---|---|---|
| 5,951,081 | A | * | 9/1999 | Foster et al. ................. 295/36.1 |
| 6,860,673 | B2 | * | 3/2005 | Zaps ............................ 403/344 |
| 7,377,735 | B2 | * | 5/2008 | Cosenza et al. ............... 411/517 |
| 2006/0216133 | A1 | | 9/2006 | Cosenza et al. |

OTHER PUBLICATIONS

International Search Report and Written Opinion issued in connection with Applicants' International Application No. PCT/US2011/039978 (10 pages).

U.S. Appl. No. 13/159,584, filed Jun. 14, 2011 on "Captive Panel Fastener Assembly" (56 pages).

* cited by examiner

RETAINER RING

CROSS-REFERENCE TO RELATED APPLICATION

This application is a Section 111(a) application relating to and claims the benefit of commonly owned, U.S. Provisional Patent Application Ser. No. 61/397,618 entitled "RETAINER RING," filed Jun. 14, 2010 and U.S. Provisional Application Ser. No. 61/397,617 entitled "CAPTIVE PANEL FASTENER ASSEMBLY", filed Jun. 14, 2010, the entireties of which are incorporated herein by reference.

FIELD OF THE INVENTION

The present invention relates to retainer rings and, more particularly, to retainer rings for captive fastener assemblies.

BACKGROUND OF THE INVENTION

In certain applications, it is desirable to retain (i.e., captivate) a bolt, screw or the like onto a structure while providing the ability to hold the bolt in a position where a head of the bolt is held away from the structure (i.e., in a hold-out position). What is needed is a retainer ring for a fastener that facilatates captivation and bolt hold-out.

SUMMARY OF THE INVENTION

In an embodiment, a retainer ring includes an outer ring having an exterior surface, and an interior surface, and at least one spring beam element extending from the interior surface of the outer ring; and a centrally-located aperture that is sized and shaped to receive a bolt, wherein when the bolt engages the retainer ring, the at least one spring beam element is displaced and expands radially from a free position to an expanded position in order to enable the bolt to travel through the aperture. In an embodiment, the bolt includes an annular groove, and wherein when the retainer ring engages and aligns with the annular groove of the bolt, the at least one spring beam element springs back to its free position in order to captivate the bolt.

In an embodiment, the at least one spring beam element includes an elongated arm having a first end attached to the interior surface of the outer ring and a free, second end opposite the first end of the elongated arm, wherein the arm of the at least one spring beam element and the interior surface of the outer ring form a slot therebetween. In an embodiment, the at least one spring beam element of the retainer ring includes a tab portion formed at the second end of the elongated arm. In an embodiment, the at least one spring beam element includes a plurality of spring beam elements. In an embodiment, each of the elongated arms of the plurality of spring beam elements is curvilinear in shape. In an embodiment, each of the arms is positioned concentrically with the outer ring. In an embodiment, each of the arms is positioned eccentrically with the outer ring.

In an embodiment, the retainer ring is adapted to be installed within a housing, wherein the housing includes an outer wall, an inner wall, and a channel formed between the inner wall and the outer wall, wherein the channel of the housing is sized and shaped to receive the retainer ring such that the exterior surface of the outer ring of the retainer ring is juxtaposed with the outer wall of the housing, and each of the plurality of spring beam elements of the retainer ring is juxtaposed with the inner wall of the housing. In an embodiment, the housing includes a plurality of windows formed within the inner wall, wherein each of the plurality of windows includes a stop surface, and wherein each of the plurality of windows of the housing is sized and shaped to receive a corresponding one of the tab portions of the plurality of spring beam elements of the retainer ring. In an embodiment, each of the tab portions of the retainer ring includes a pressure pad, wherein when the plurality of spring beam elements are in their expanded positions, each of the pressure pads contacts a corresponding one of the stop surfaces of the housing.

In an embodiment, the retainer ring captivates threaded elements, such as bolts, screws or other fastening bolts, onto structures while providing the ability to hold the mating bolt in a position where the head of the bolt is held away from the structure. In an embodiment, the retainer ring is housed in a grommet which is captivated to a structure. In an embodiment, the retainer ring, as part of the grommet assembly, captivates the bolt onto the work piece, while providing a positive hold out of the bolt, i.e., where the head of the bolt is held away from the work piece. In an embodiment, the retainer ring is encapsulated in a housing and attached to a structure without a grommet. In an embodiment, the retainer ring is utilized without attaching it to a structure, such that it retains a bolt or other threaded member to the structure without providing a hold out function. In an embodiment, the retainer ring is utilized without a housing.

In an embodiment, the retainer ring is used as part of a captive panel fastener for access panels, such as those found on commercial or military aircraft. In other embodiments, the retainer ring may be used with any type of suitable fastener, panel, structure, or work piece and in other types of fields and applications.

BRIEF DESCRIPTION OF THE DRAWINGS

Reference is made to the following detailed description of the embodiments considered in conjunction with the accompanying drawings, in which.

DETAILED DESCRIPTION OF THE DRAWINGS

Figure 1A:
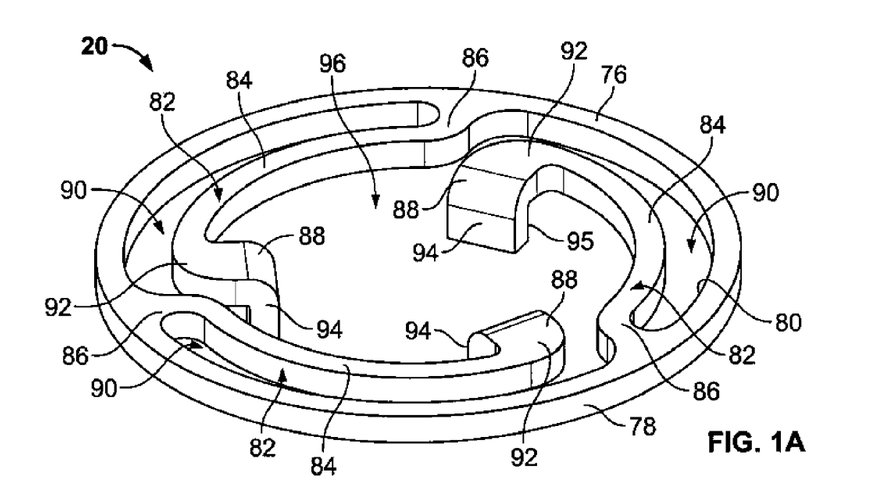
FIGS. 1A and 1B are top and bottom perspective views of an embodiment of a retainer ring in accordance with the present invention.
Figure 1B:
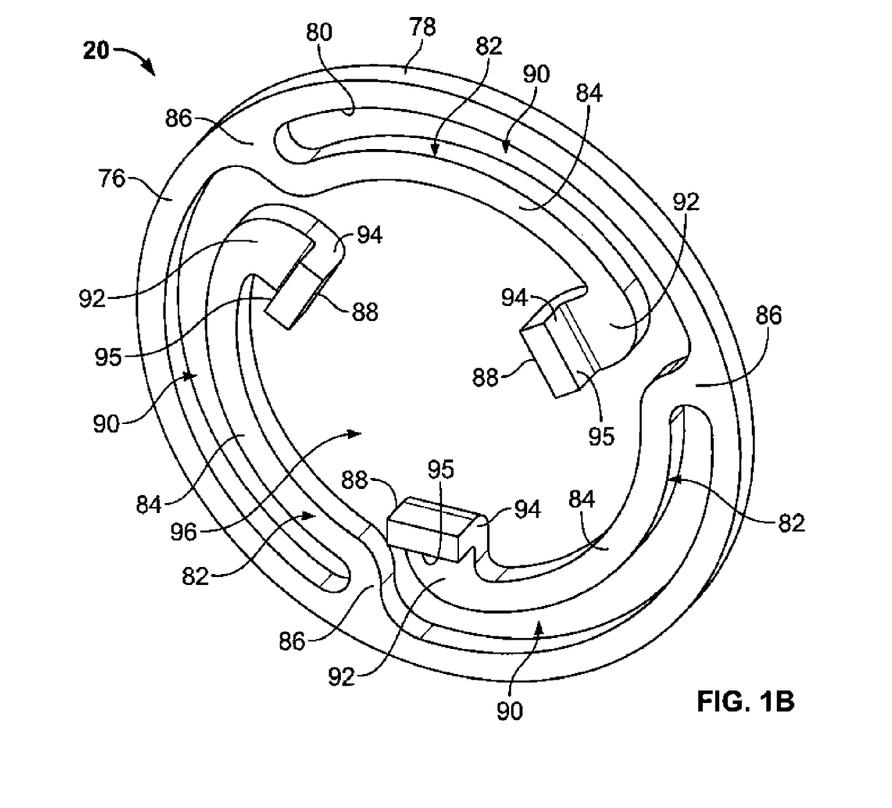

Referring to FIGS. 1A and 1B, in an embodiment, a retainer ring 20 includes an outer ring 76 having an exterior surface 78, an interior surface 80, and a plurality of spring beam elements 82 extending inwardly from the interior surface 80. In an embodiment, each of the spring beam elements 82 includes an elongated arm 84 having a first end 86 attached integrally to the interior surface 80 of the outer ring 76, and a second, free end 88 opposite the first end 86. In an embodiment, a slot 90 is formed between each of the arms 84 and the interior surface 80 of the outer ring 76. The slots 90 allow for deflection of the beam elements 82. In an embodiment, each of the arms 84 is curvilinear in shape and is positioned concentrically with the outer ring 76. In another embodiment, each of the arms 84 is positioned eccentrically with the outer ring 76. In an embodiment, the outer ring 76 is continuous. In another embodiment, the outer ring 76 need not be continuous, and rather than the beam elements 82 being curvilinear in shape, they can be configured to extend from one point on the outer ring 76 in a direction toward another point on the outer ring 76 while not passing through the center of the retainer ring 20 (not shown in the Figures).

Figure 4:
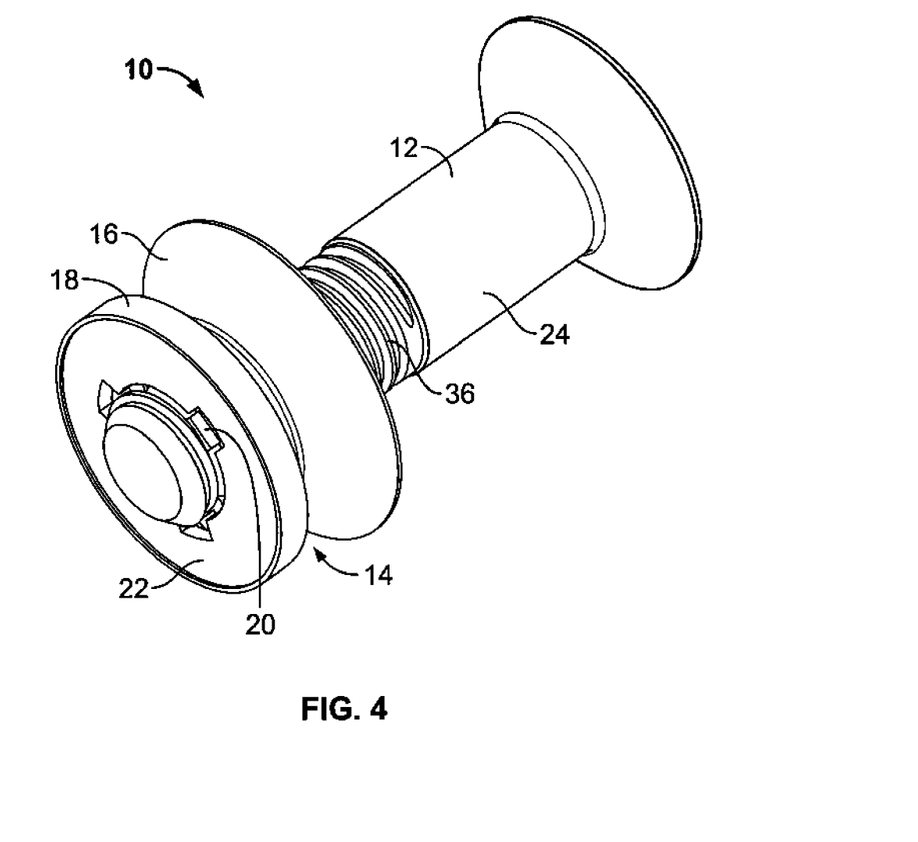
FIG. 4 is a perspective view of the captive panel fastener shown in FIG. 3 as assembled.

Still referring to FIGS. 1A and 1B, in an embodiment, each of free ends 88 of the arms 84 includes a tab portion 92. In an embodiment, each of the tab portions 92 extends substantially perpendicular to and in the same plane as the corresponding free end 88 of the arm 84. In an embodiment, a pressure pad 94 extends from each of a corresponding one of the tab portions 92. In an embodiment, each of the pressure pads 94 includes an outer surface 95 (see FIG. 4A). In an embodiment, each of the pressure pads 94 extends perpendicular to the corresponding arm 84 in a second direction, i.e., 90 degrees from the plane in which the retainer ring 20 lies. In an embodiment, each of the tab portions 92 is generally wider than the corresponding spring beam element 82 and is sized to resist shear load action on the beam element 82. In an embodiment, each of the pressure pads 94 is thicker than the nominal thickness of the retainer ring 20. In an embodiment, a centrally-located aperture 96 is formed between the free ends 88 of the beam elements 82. As to be described below, the aperture 96 is sized and shaped to receive the bolt 12.

Figure 2:
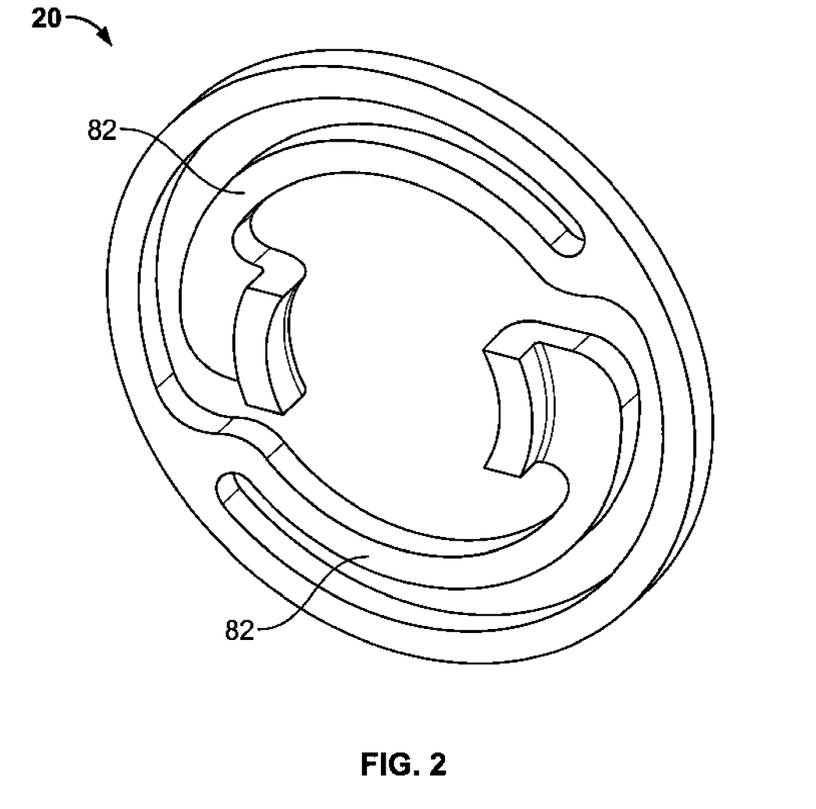
FIG. 2 is a bottom perspective view of another embodiment of a retainer ring.

In an embodiment, as shown in FIGS. 1A and 1B, the retainer ring 20 includes three of the spring beam elements 82. In another embodiment, as shown in FIG. 2, the retainer ring 20 may include two of the spring beam elements 82. In other embodiments, the retainer ring 20 may include one of the spring beam elements 82 or more than three of the spring beam elements 82 (not shown in the Figures). In an embodiment, the retainer ring 20 is made from a beta-Titanium alloy. In other embodiments, the retainer ring 20 is made from stainless steel or other suitable materials known in the art.

Figure 3:
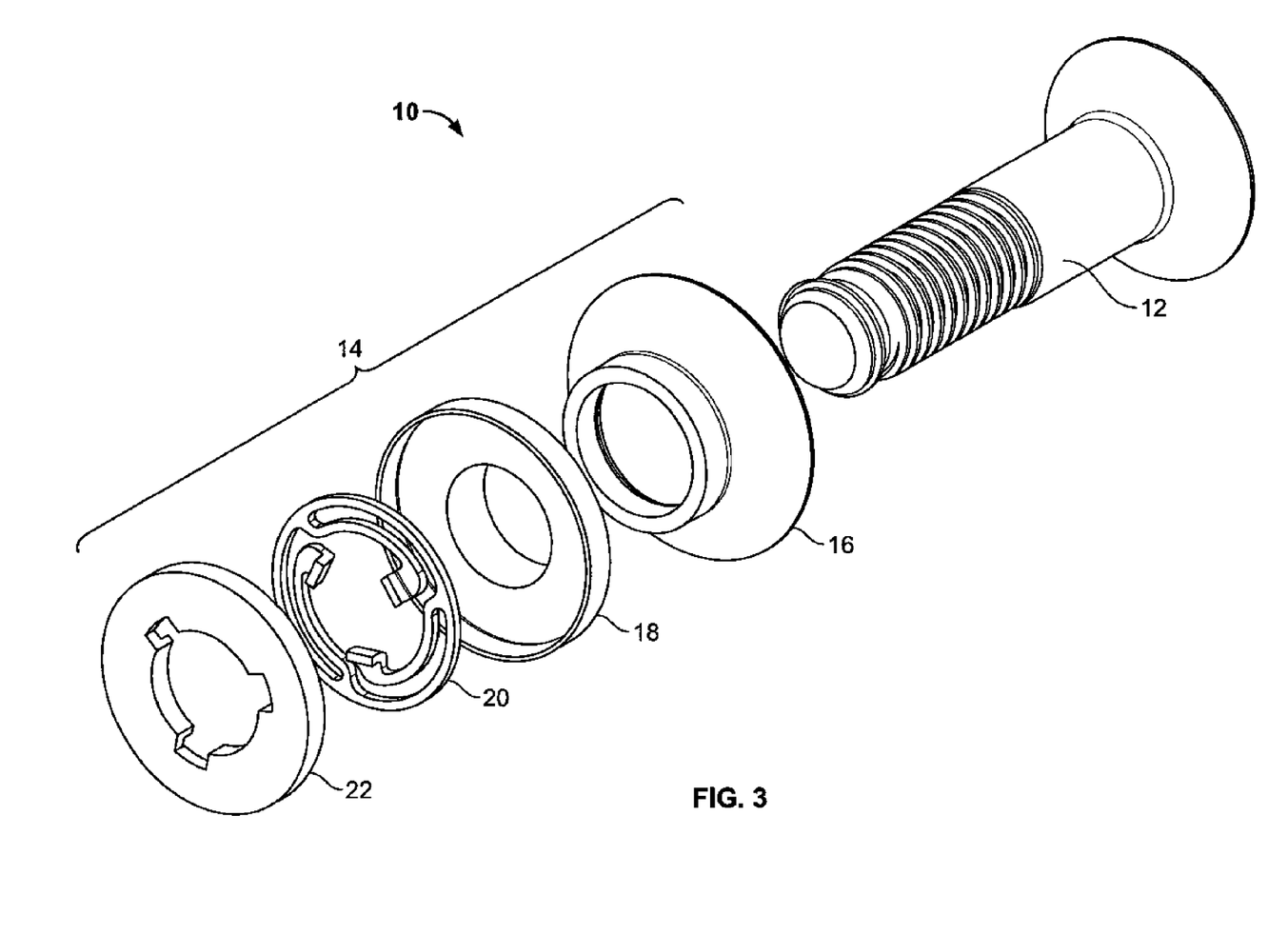
FIG. 3 is an exploded perspective view of the retainer ring shown in FIGS. 1A and 1B used as a component of a captive panel fastener.

Referring to FIGS. 3 and 4, in an embodiment, the retainer ring 20 is shown as part of a captive panel fastener 10, which includes a bolt 12 and a grommet assembly 14 attached to the bolt 12. In other embodiments, the bolt 12 may be substituted with a screw or other pin members known in the art. In an embodiment, the grommet assembly 14 includes an upper grommet 16, a lower grommet 18, the retainer ring 20, and a housing 22. In an embodiment, the retainer ring 20 is encapsulated within the housing 22 (see FIGS. 4 and 6).

Figure 5:
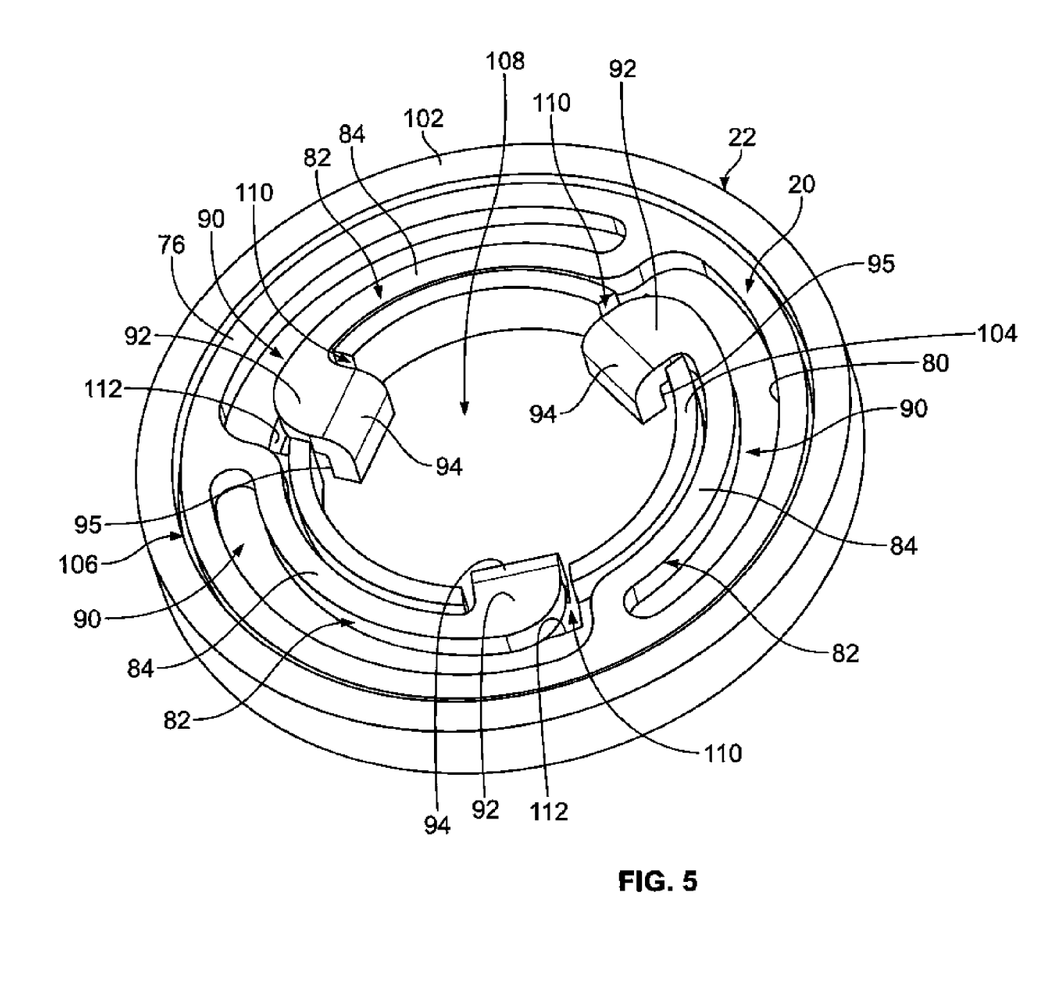
FIG. 5 is a perspective view of the retainer ring shown in FIGS. 1A and 1B engaged with a housing shown in FIG. 3.

Referring to FIG. 5, in an embodiment, the housing 22 is sized and shaped to house the retainer ring 20. In an embodiment, an inner diameter of an outer wall 102 of the housing 22 is larger than the outer diameter of the outer ring 76 of the retainer ring 20 in order for the housing 22 to receive the retainer ring 20 within a channel 106 formed therein. In an embodiment, when the retainer ring 20 is housed within the housing 22, each of a plurality of windows 110 of the housing 22 is sized and shaped to receive a corresponding one of the tab portions 92 of the retainer ring 20. In an embodiment, the pressure pads 94 of the retainer ring 20 extend freely within an aperture 108 of the housing 22, while the arms 84 of the beam elements 82 of the retainer ring 20 lie within the channel 106 and are juxtaposed with inner wall 104 of the housing 22. As to be described in more detail below, in an embodiment, each of the spring beam elements 82 is moveable between a free position, in which each of the pressure pads 94 of the retainer ring 20 resides within its corresponding one of the windows 110 of the housing 22, to an expanded position, in which the outer surface 95 of the pressure pad 94 contacts a corresponding one of a plurality of stop surfaces 112 of the housing 22. In an embodiment, the slots 90 of the retainer ring 20 allow for such movement of the spring beam elements 82. Accordingly, in an embodiment, the travel of the spring beam elements 82 are impeded by the stop sections 112 when the spring beam elements 82 are in their expanded positions. In an embodiment, the windows 110 allow the tab portions 92 to protrude inside the internal diameter of the grommet assembly 14.

Figure 6:
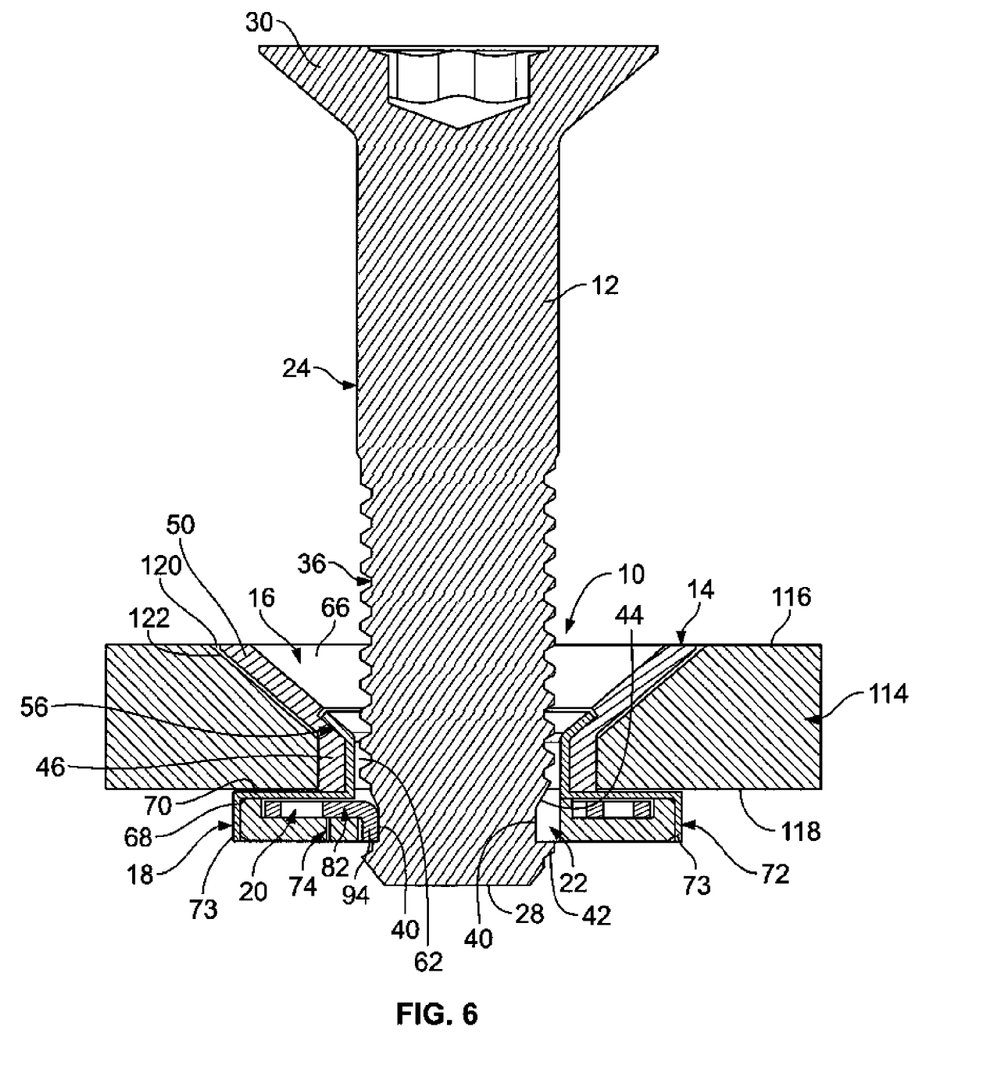
FIG. 6 is a cross-sectional view of the captive panel fastener shown in FIG. 3 attached to a panel and in a fully retracted, hold-out position.

Referring to FIG. 6, the fastener 10 is installed within a work piece 114 having a first side 116 and a second side 118 opposite the first side 116, and a hole 120 extending from the first side 116 to the second side 118. In an embodiment, the work piece 114 is a panel. In an embodiment, the work piece 114 is a carbon fiber reinforced structure. In an embodiment, the upper grommet 16 is inserted into the hole 120 of the work piece 114. In an embodiment, the hole 120 includes a countersunk area 122 formed at the first side 116 and sized and shaped to receive a head 50 of the upper grommet 16 so that the top of the head 50 is flush with the first side 116 of the work piece 114. In an embodiment, the upper grommet 16 lines the countersunk area 122 of the hole 120 in order to protect the work piece 114 from wear and usage. In an embodiment, the fastener 10 need not include the upper grommet 16. Next, in an embodiment, a tubular portion 62 of the lower grommet 18, which is originally configured without a flared portion 66 (not shown in the Figures), is inserted into an aperture of a receptacle 46 of the upper grommet 16 from the second side 118 of the work piece 114. In an embodiment, the receptacle 46 of the upper grommet 16 is sized and shaped to receive the tubular portion 62 of the lower grommet 18. In an embodiment, the flared portion 66 is then formed by mechanically flaring or swaging the top of the tubular portion 62 of the lower grommet 18, such that the flared portion 66 sits within the annular pocket 56 of the upper grommet 16. In an embodiment, a top surface 70 of a base member 68 of the lower grommet 18 is juxtaposed with the second side 118 of the work piece 114.

Next, in an embodiment, the retainer ring 20 is assembled with the housing 22 as described above and shown in FIG. 5, and the assembly is inserted within an interior portion 74 of the lower grommet 18. In an embodiment, the inner diameter of the interior portion 74 of the lower grommet 18 is larger than the outer diameter of the housing 22 and is sized and shaped to receive the housing 22. In an embodiment, a lower end 73 of an annular compressive wall 72 of the lower grommet 18 is then compressed about its periphery to encapsulate the retainer ring 20 and the housing 22 within the interior portion 74 of the lower grommet 18 and to prevent the retainer ring 20 and the housing 22 from escaping (see FIG. 6).

Next, referring to FIG. 6, in an embodiment, the second end 28 of the bolt 12 is inserted into the grommet assembly 14 from the first side 116 of the work piece 114, such that a threaded portion 36 of a shank 24 of the bolt 12 enters the apertures of the upper and lower grommets 16, 18, respectively, until the second end 28 of the bolt 12 reaches the retainer ring 20. In an embodiment, as the bolt 12 engages the retainer ring 20, the spring beam elements 82 are displaced and expand radially from their free state position to their expanded position in order to enable the bolt 12 to travel within the aperture 96 of the retainer ring 20 (not shown in FIG. 6). As mentioned above, in an embodiment, the spring beam elements 82 can radially expand until the pressure pads 94 engage the stop surfaces 112 of the housing 22, so as to prevent the spring beam elements 82 from traveling too far and permanently deforming (see FIG. 5). Thus, in an embodiment, the position of the pressure pads 94 on the tab portions 92 is configured to limit the travel of the spring beam elements 82 as they come in contact with the stop surfaces 112 of the windows 110. In an embodiment, this provides a limit to the stress on the beam elements 82 when the retainer ring 20 is housed in the grommet assembly 14. In an embodiment, the interior surface 80 of the outer ring 76 of the retainer ring 20 acts as a second limit to the deflection of the spring beam elements 82 (see FIG. 5).

In an embodiment, as shown in FIG. 6, as the bolt 12 is pushed into the retainer ring 20 and the pressure pads 94 engage and align with an annular groove 40 of the bolt 12, the spring beam elements 82 spring back from their expanded positions to their free state positions. In this manner, in an embodiment, the pressure pads 94 engage and reside within the annular groove 40, resulting in the bolt 12 being captivated to the grommet assembly 14. As shown in FIG. 6, the bolt 12 is in a full hold-out position. In an embodiment, a ramped portion 44 of the bolt 12 enables it to be inserted further into the work piece 114 through the grommet assembly 14 so as to expose the threaded portion 36 of the bolt 12 from the second side 118 of the work piece 114 to receive a locking member, such as a nut, collar or the like (not shown in the Figures). In an embodiment, the bolt 12 can also be retracted back to the hold-out position. In one or more embodiments, the retainer ring 20 is sized and shaped to slide over the threaded portion 36 of the bolt 12 with little resistance. In an embodiment, a first annular portion 42 inhibits the bolt 12 from being decaptivated from the grommet assembly 14.

In an embodiment, the pressure pads 94 distribute the bearing loads and enable the retainer ring 20 to straddle two adjacent threads 38 of the bolt 12 and slide over the threads 38 without impedance. In one or more embodiments, the thickness of the pressure pads 94 can be symmetric to the thickness of the retainer ring 20 or it can asymmetric with the thickness of the retainer ring 20.

In an embodiment, as mentioned above, the fastener 10 provides for hold out of the bolt 12 while captivating the bolt 12 to the grommet assembly 14 and the work piece 114 upon which it is installed. In its free state, the retainer ring 20 resides in the annular groove 40 at the second end 28 of the bolt 12 to captivate the bolt 12 to the grommet assembly 14. In an embodiment, the intersection of the threads 38 and the annular groove 40 provides a bearing surface for the retainer ring 20 to limit the axial travel of the bolt 12 and to inhibit the bolt 12 from being removed from the grommet assembly 14. In an embodiment, the bolt 12 resides in the "full retracted position," in which the bolt 12 is in a position where the head 30 of the bolt 12 is at a maximum distance from the grommet assembly 14 while still being captivated unto the work piece 114 by the grommet assembly 14. In an embodiment, this feature which provides resistance to remove the bolt 12 from the work piece 114 is measured by pushing on the bolt 12 to remove it from the work piece 114. In an embodiment, the bolt 12 is free to be moved axially from the position where the head 30 of the bolt 12 is at maximum distance from the work piece to where the head 30 of the bolt 12 is in contact with the grommet assembly 14 with an amount of force. In an embodiment, this force is 10 lbs. However, in an embodiment, the grommet assembly 14 will hold the bolt 12 stationary in any axial position until an external force is applied by a user. The ability of the grommet assembly 14 to hold the bolt 12 stationary is commonly referred to as "bolt hold out". In an embodiment, the bolt 12 is a solid piece with no hollow portions in the shank portion 24; and, therefore, the full strength of the bolt 12 is utilized.

In an embodiment, the retainer ring 20 has a radial displacement which is capable of contracting in its free state to a diameter equivalent to a minor diameter of the threaded portion 36 of the bolt 12. In the expanded condition, an embodiment of the retainer ring 20 is capable of passing over a major diameter of the threaded portion 36. In an embodiment, the retainer ring 20 is capable of displacement from the free-state to the expanded state without exceeding the elastic limit of the retainer ring 20. In an embodiment, the retainer ring 20 holds or fixes the bolt 12 which it accommodates. That is, the retainer ring 20 will hold the bolt 12 in a position concentric to the central axis of the retainer ring 20 while restricting the axial movement of the bolt 12 through the retainer ring 20. In an embodiment, movement of the bolt 12 through the retainer ring 20 requires the application of an external force to overcome the restriction of the ring 20. In an embodiment, the restriction of the retainer ring 20 can be adjusted by sizing the spring beam elements 82.

Figures 7A, 7B, 7C:
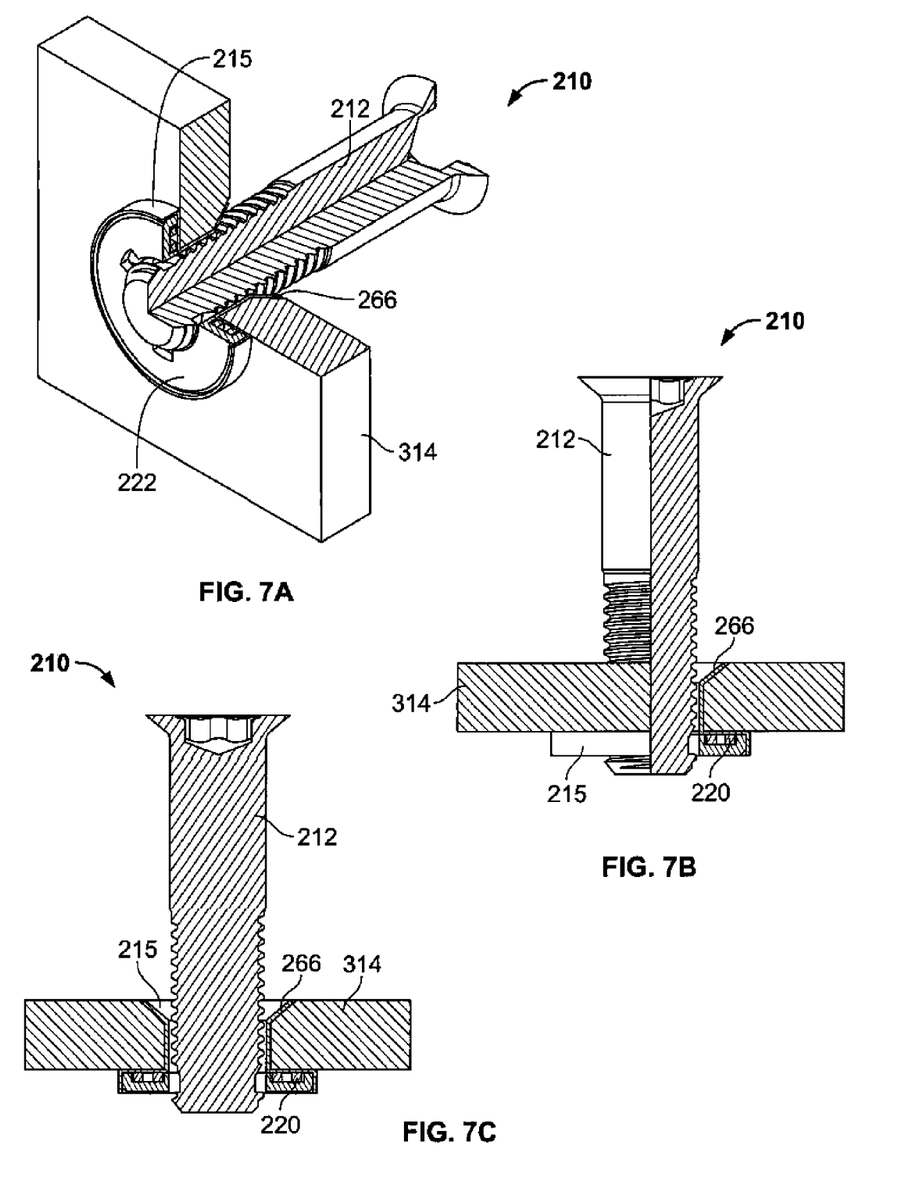
FIGS. 7A through 7C are cross-sectional views of a captive panel fastener in accordance with another embodiment, which incorporates the retainer ring shown in FIGS. 1A and 1B.

It will be understood that the retainer ring 20 and its use described herein is merely exemplary and that a person skilled in the art may make many variations and modifications without departing from the full spirit and the scope of the embodiments described herein. For example, in an embodiment, the retainer ring 20 can be utilized with a fastener assembly 14 that doesn't include the upper grommet 16, such that the lower grommet 18 can be attached to the work piece 114 directly. For example, referring to FIGS. 7A through 7C, in an embodiment, a captive panel fastener 210 includes a bolt 212, a one-piece grommet 215, a retainer ring 220, and a housing 222. The fastener 210 is structured and functions similar to the fastener 10, except that the grommet 215 is attached directly to the work piece 314 by a flared portion 266. In an embodiment, the retainer ring 220 is encapsulated in the grommet 215.

Figures 8A, 8B, 8C:
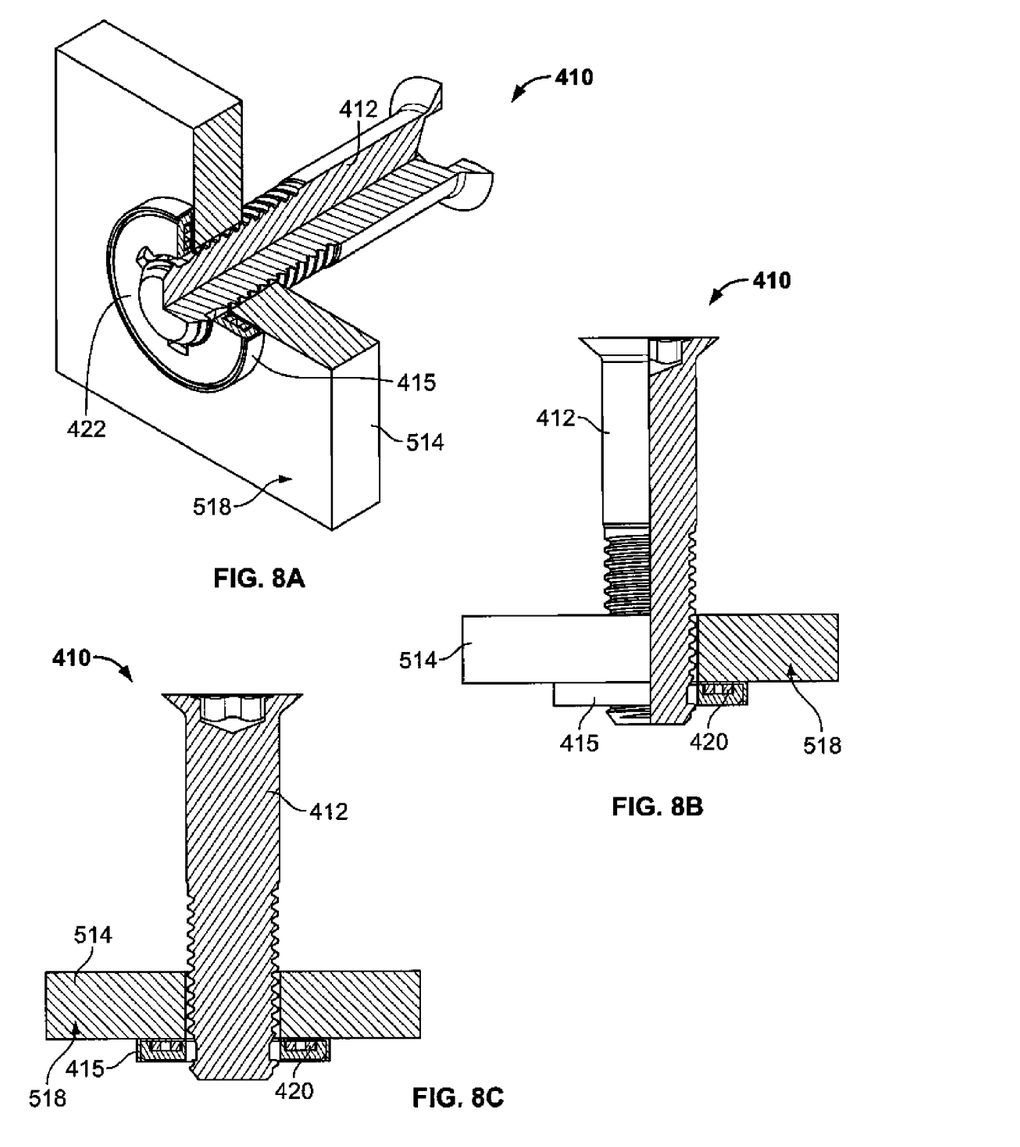
FIGS. 8A through 8C are cross-sectional views of a captive panel fastener in accordance with another embodiment, which incorporates the retainer ring shown in FIGS. 1A and 1B.

In another embodiment, referring to FIGS. 8A through 8C, a captive panel fastener 410 includes a bolt 412, a disc-shaped member 415, a retainer ring 420, and a housing 422. The fastener 410 is structured and functions similar to the fastener 10, except that there is no grommet and the member 415 is attached directly to a second side 518 of a work piece 514. In an embodiment, the retainer ring 420 is encapsulated by the member 415. In an embodiment, the member 415 can consist of other shapes and sizes. In other embodiments, the member 415 can be attached to the work piece 514 by bonding, adhesives, welding, mechanical means such as rivets or other fasteners, or other suitable fastening and securing means known in the art.

Figure 9A:
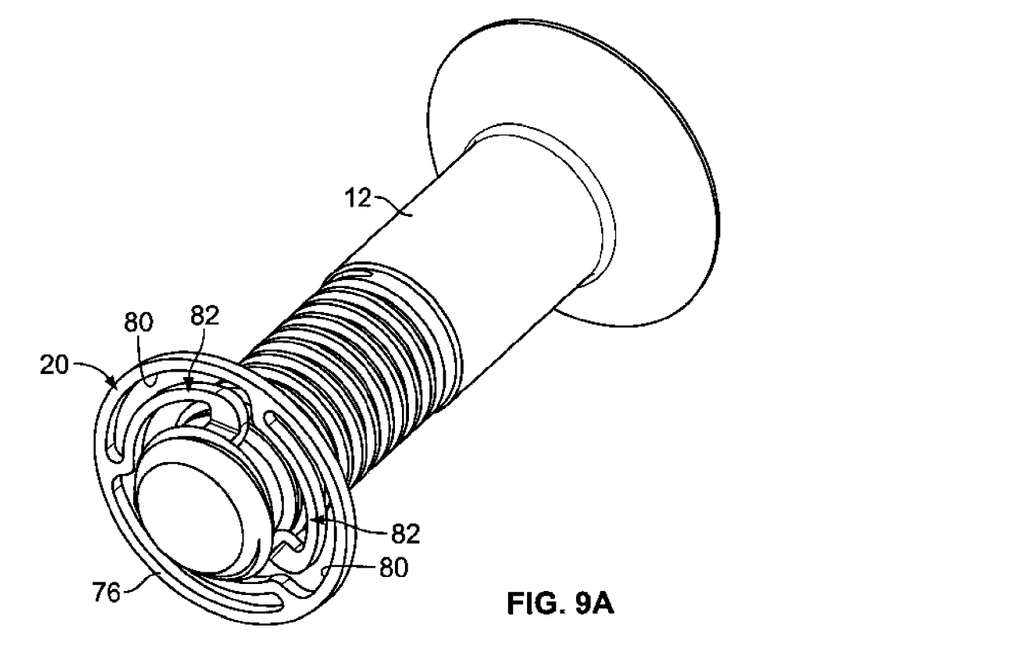
FIGS. 9A and 9B is another embodiment of the retainer ring shown in FIGS. 1A and 1B attached to a bolt.
Figure 9B:
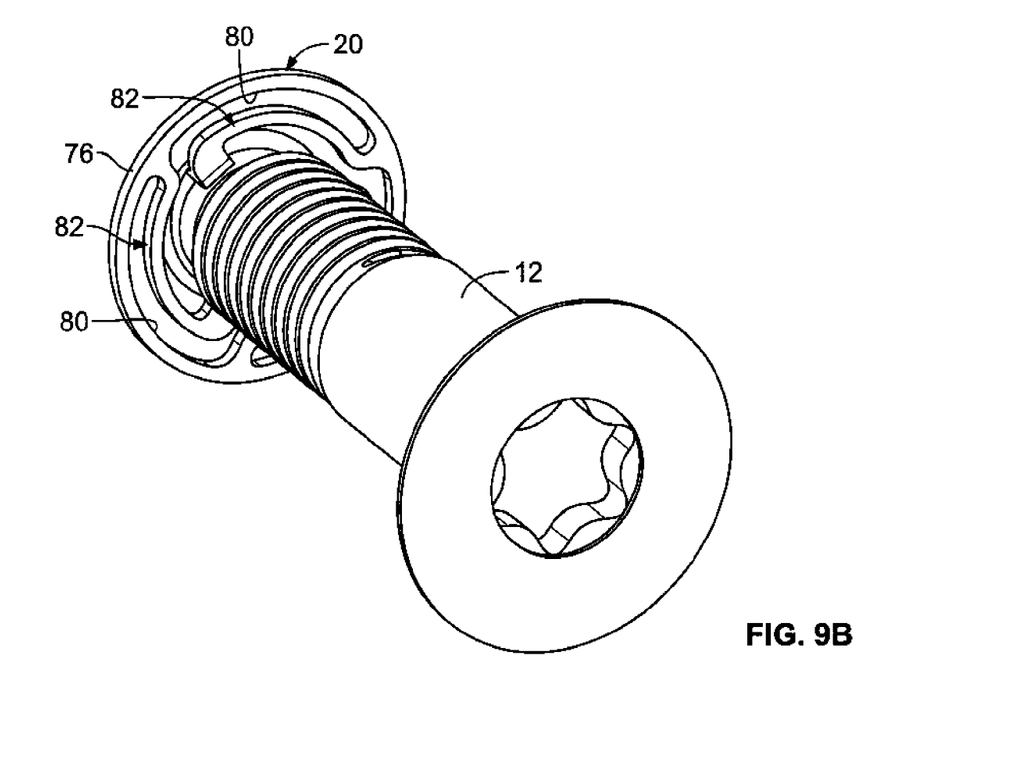

In another embodiment, the fastener 10 need not include the upper and lower grommets 16, 18 and the housing 22. In this regard, in the embodiments shown in FIGS. 9A and 9B, the retainer ring 20 can be attached directly to the bolt 12 in the manner as described above. In this regard, the interior surface 80 of the outer ring 76 of the retainer ring 20 limits the deflection of the beam elements 82.

Figures 10A, 10B:
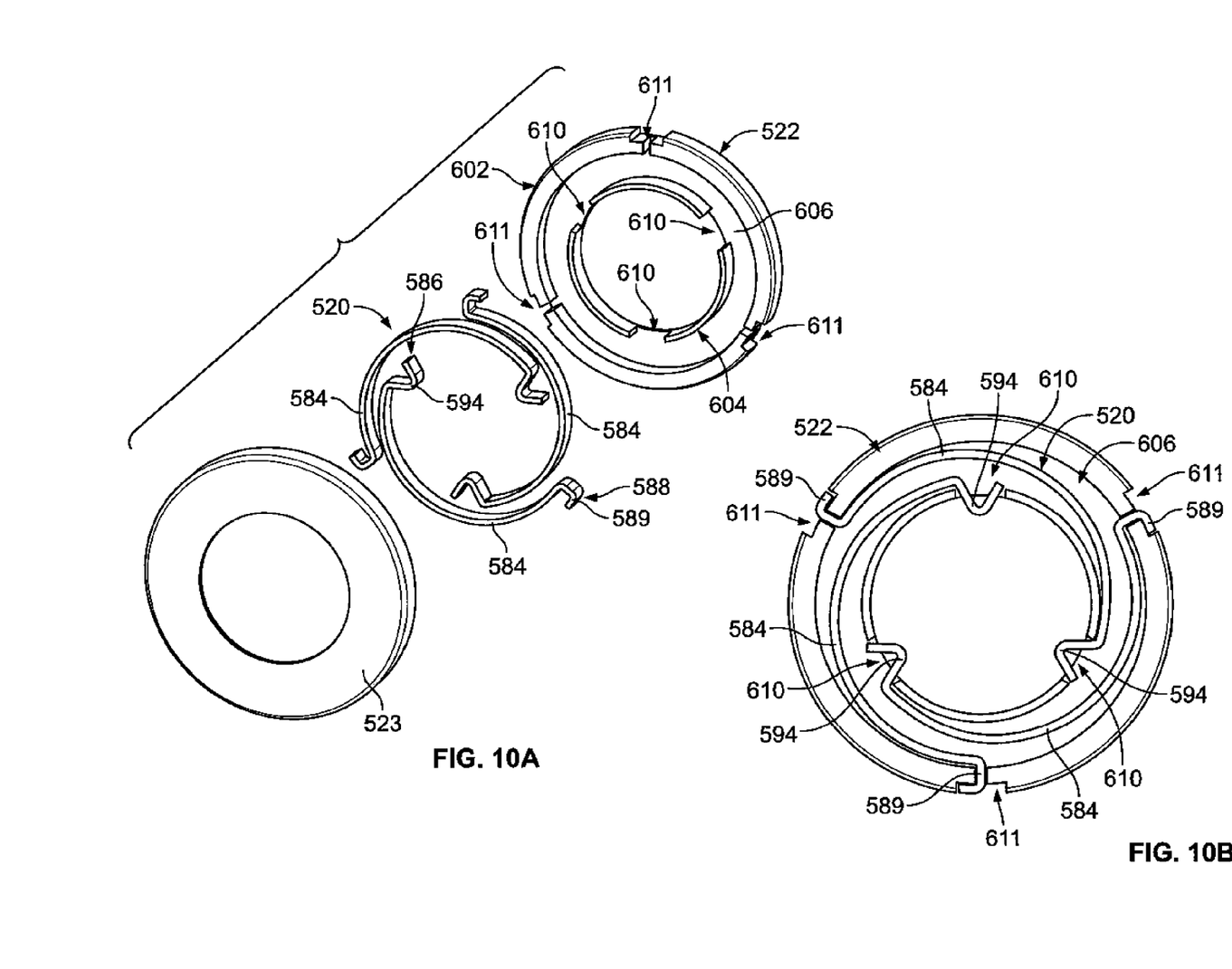
FIGS. 10A and 10B show another embodiment of a retainer ring and its associated housing.

FIGS. 10A and 10B show an embodiment of a retainer ring 520, a housing 522, and a cover 523 that is attached to the housing 522. Referring to FIG. 10A, in an embodiment, the retainer ring 520 includes three separate and distinct curvilinear-shaped, cantilevered arms 584, each of which includes a first end 586 having a V-shaped engagement member 594, and a second end 588 opposite the first end 586 and having a U-shaped hook member 589. In an embodiment, the housing 522 includes a circular-shaped outer wall 602 and a circular-shaped inner wall 604 spaced apart from and concentric with the outer wall 602. In an embodiment, the outer and inner walls 602, 604 form a circular-shaped channel 606. In an embodiment, the inner wall 604 includes a plurality of windows 610 extending therethrough, while the outer wall 604 includes a plurality of T-shaped slots 611 formed therein. In an embodiment, the housing 522 includes three of the windows 610, which are positioned equidistant from one another, and three of the slots 611 which are positioned equidistant from one another. Referring to FIG. 10B, in an embodiment, each of the arms 584 of the retainer ring 520 are housed within the channel 606 of the housing 522. In this regard, each of the hook members 589 engages a corresponding one of the slots 611 of the housing 522, while each of the engagement members 594 resides within a corresponding one of the windows 610.

In an embodiment, when a bolt (such as the bolt 12) engages the retainer ring 520, the first ends 586 of the arms 584 are displaced and expand radially from a free state position to an expanded position in order to enable the bolt 12 to travel within the ring 520 (not shown in the Figures). During the insertion of the bolt 12, the second ends 588 of the arms 584 are secured in place by the engagement of the hook members 589 of the retainer ring 520 with the slots 611 of the housing 522. As the bolt 12 is pushed into the retainer ring 520 and the engagement members 594 engage and align with the annular groove 40 of the bolt 12, the arms 584 spring back from their expanded positions to their free state positions (not shown the Figures). In this manner, the vertices of the engagement members 594 engage and reside within the annular groove 40 of the bolt 12, resulting in the bolt 12 being captivated (not shown in the Figures).

Figure 11A:
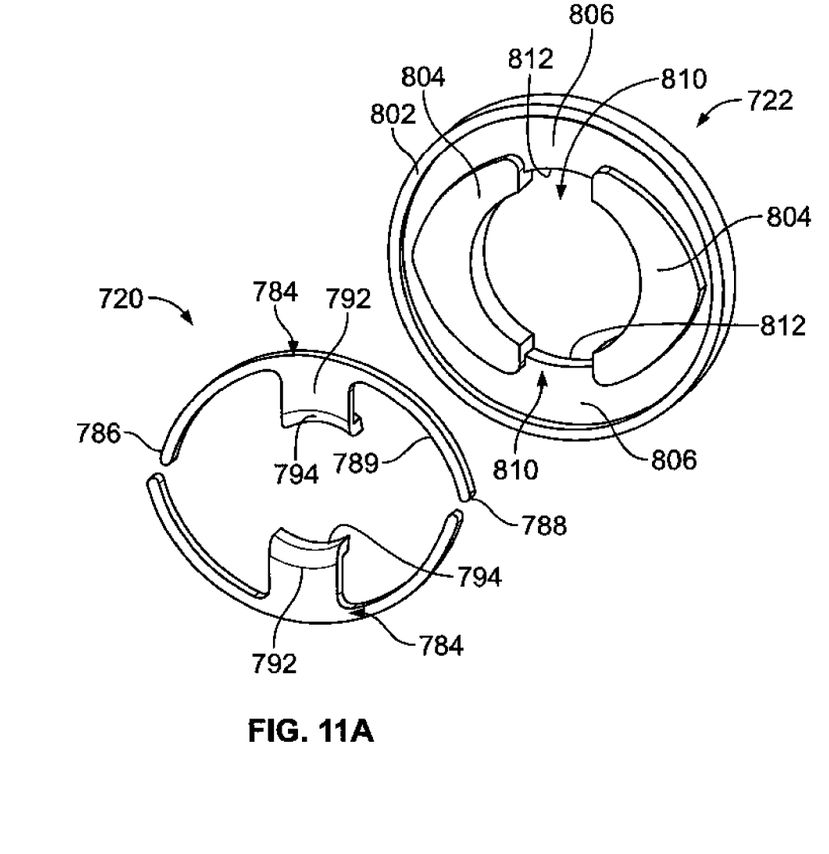
FIGS. 11A and 11B show another embodiment of a retainer ring and its associated housing.
Figure 11B:
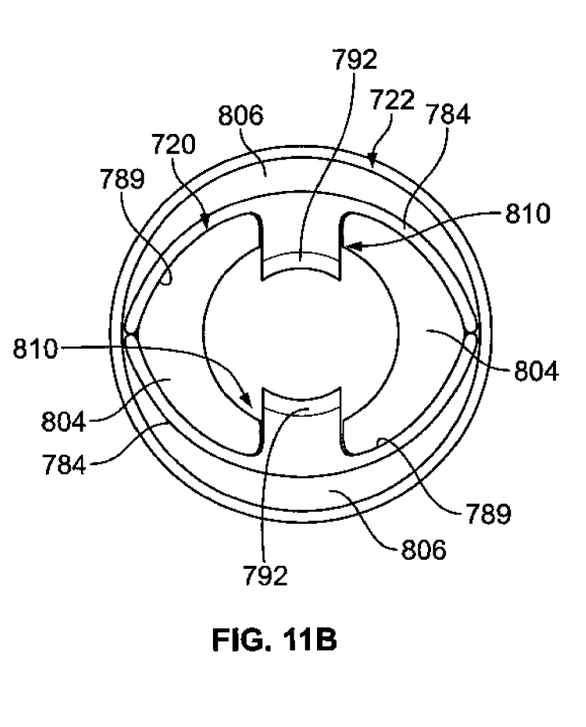

FIGS. 11A and 11B show an embodiment of a retainer ring 720 and a housing 722. Referring to FIG. 11A, in an embodiment, the retainer ring 720 includes a pair of distinct curvilinear-shaped, cantilevered arms 784, each of which includes a first end 786 and a second end 788 opposite the first end 786, an inner surface 789, and a tab portion 792 extending from the inner surface 789 and positioned intermediate the first and second ends, 786, 788. In an embodiment, a pressure pad 794 extends from each of the tab portions 792. In an embodiment, the housing 722 includes a circular-shaped outer wall 802 and a pair of V-shaped circular-shaped inner walls 804 spaced apart from and concentric with the outer wall 802. In an embodiment, the outer and inner walls 802, 804 form a pair of crescent-shaped channels 806. In an embodiment, the inner wall 804 includes a pair of windows 810 extending therethrough. In an embodiment, each of the windows 810 includes a stop surface 812. Referring to FIG. 11B, in an embodiment, each of the arms 784 of the retainer ring 720 are housed within a corresponding one of the channels 806 of the housing 722. In this regard, the inner surface 789 of the arms 784 engage the inner walls 804, while each of tab portions 792 resides within a corresponding one of the windows 810.

In an embodiment, as a bolt (such as the bolt 12) engages the retainer ring 720, the arms 784 are displaced towards the outer wall 802 in order to enable the bolt 12 to travel within the retainer ring 720 (not shown in the Figures). In an embodiment, the arms 784 displace until the pressure pads 794 engage the stop surfaces 812 of the housing 722, so as to prevent the arms 784 from traveling too far and permanently deforming (not shown in the Figures). In an embodiment, as the bolt 12 is pushed into the retainer ring 720 and the pressure pads 794 engage and align with an annular groove of the bolt 12, the arms 784 spring back to their free state positions. In this manner, the pressure pads 794 engage and reside within the annular groove 40 of the bolt 12, resulting in the bolt 12 being captivated.

Figures 12A, 12B:
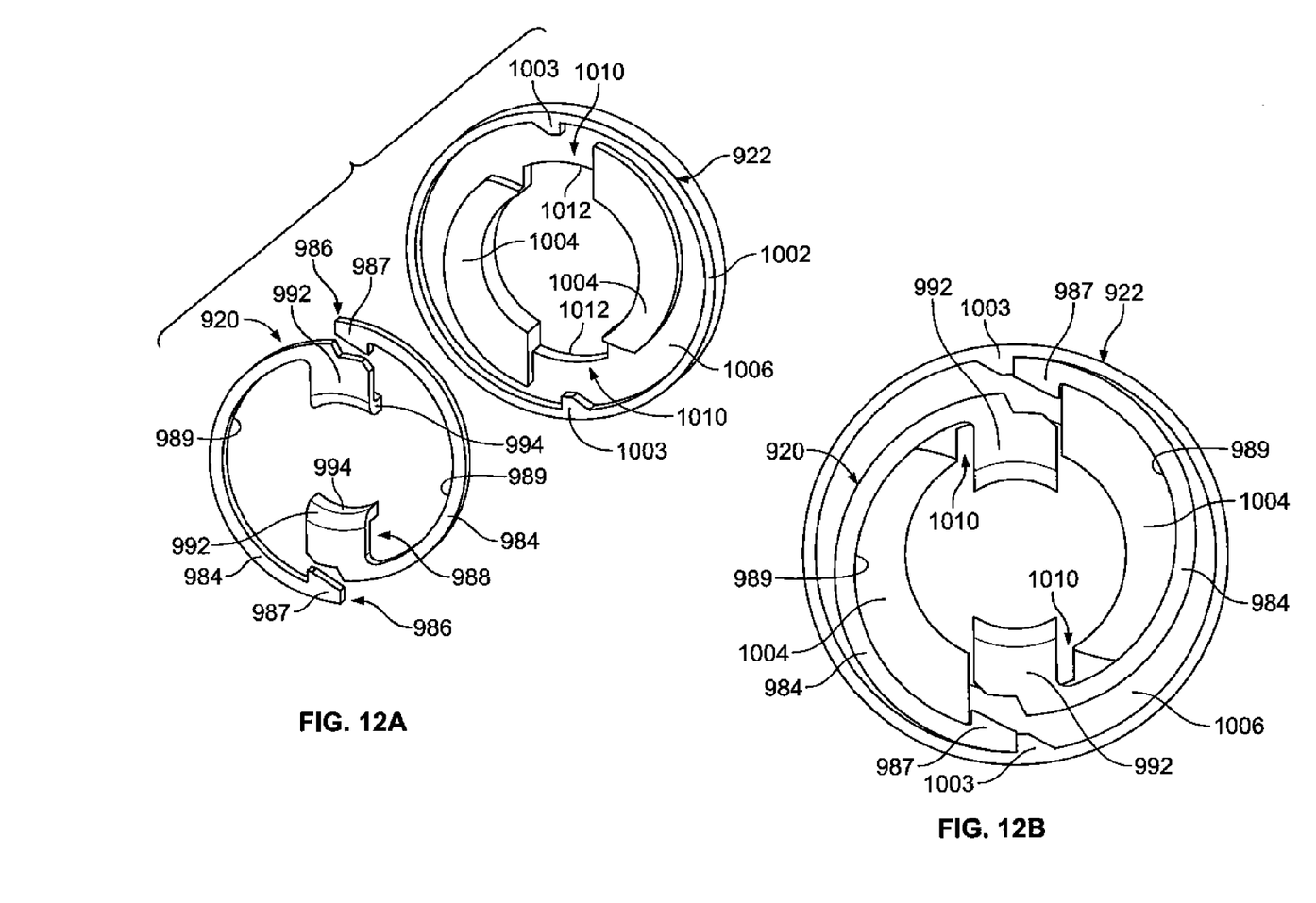
FIGS. 12A and 12B show another embodiment of a retainer ring and its associated housing.

FIGS. 12A and 12B show an embodiment of a retainer ring 920 and a housing 922. Referring to FIG. 12A, in an embodiment, the retainer ring 920 includes a pair of separate and distinct curvilinear-shaped, cantilevered arms 984, each of which includes a first end 986 and having a hook member 987 and a second end 988 opposite the first end 986 having a tab portion 992 extending therefrom. In an embodiment, a pressure pad 994 extends from each of the tab portions 992. In an embodiment, the housing 922 includes a circular-shaped outer wall 1002 and a pair of arc-shaped inner walls 1004 spaced apart from the outer wall 1002. In an embodiment, the inner walls 1004 are offset from one another. In an embodiment, the outer and inner walls 1002, 1004 form a channel 1006. In an embodiment, the inner wall 1004 includes a pair of windows 1010 extending therethrough. In an embodiment, each of the windows 1010 includes a stop surface 1012. In an embodiment, a pair of diametrically opposed tabs 1003 extends from the inner surface of the outer wall 1002 and into the channel 1006. Referring to FIG. 12B, in an embodiment, each of the arms 984 of the retainer ring 920 are housed within the channel 1006 of the housing 922. In this regard, inner surfaces 989 of the arms 984 engage the inner walls 1004, while each of tab portions 992 resides within a corresponding one of the windows 1010. In an embodiment, each of the hook members 987 engages an end of a corresponding one of the inner walls 1004 and one of the tabs 1003 of the housing 922.

In an embodiment, when a bolt (such as the bolt 12) engages the retainer ring 920, the first ends 986 of the arms 984 are displaced and expand radially from a free state position to an expanded position in order to enable the bolt 12 to travel within the ring 920 (not shown in the Figures). During the insertion of the bolt 12, the second ends 988 of the arms 984 are secured in place by the engagement of the hook members 987 of the retainer ring 920. In an embodiment, the arms 984 displace until the pressure pads 994 engage the stop surfaces 1012 of the housing 922, so as to prevent the arms 982 from traveling too far and permanently deforming (not shown in the Figures). In an embodiment, as the bolt 12 is pushed into the retainer ring 920 and the pressure pads 994 engage and align with an annular groove 40 of the bolt 12, the arms 984 spring back to their free state positions. In this manner, the pressure pads 994 engage and reside within the annular groove 40 of the bolt 12, resulting in the bolt 12 being captivated.

Figure 13:
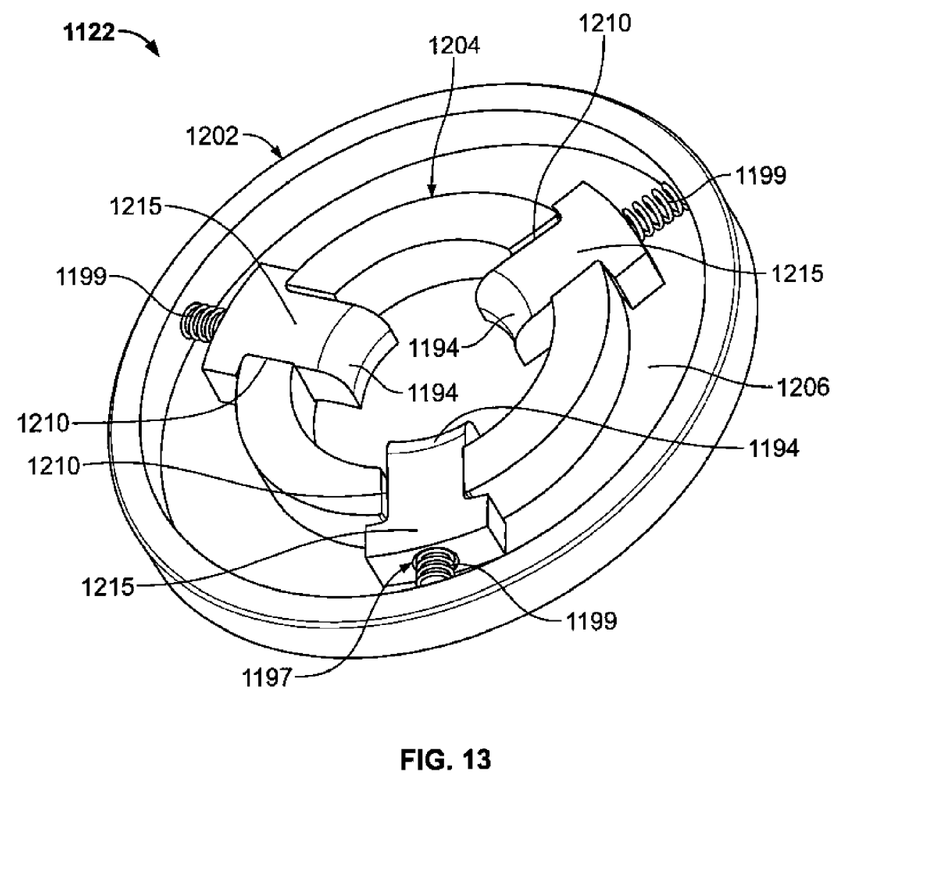
FIG. 13 is a top perspective view of another embodiment of a housing and sliding pawl retainer system.

FIG. 13 shows an embodiment of a housing 1122 which includes a circular-shaped outer wall 1202 and a circular-shaped inner wall 1204 spaced apart from the outer wall 1202. In an embodiment, the outer and inner walls 1202, 1204 form a channel 1206. In an embodiment, the inner wall 1204 includes a plurality of windows 1210 extending therethrough.

In an embodiment, the housing 1122 includes a plurality of T-shaped pawls 1215 which are slidably positioned within the windows 1210. In an embodiment, each of the pawls 1215 includes a pressure pad 1194. In an embodiment, each of the pawls 1215 includes an aperture 1197 adapted to receive a spring 1199, which is positioned against an inner surface of the outer wall 1202.

In an embodiment, when a bolt (such as the bolt 12) engages the housing 1122, the pawls 1215 are displaced and slide outwardly towards the outer wall 1202 in order to enable the bolt 12 to travel within the housing 1122 (not shown in the Figures). In an embodiment, the pawls 1215 displace until the pawls 1215 engage the inner surface of the outer wall 1202 (not shown in the Figures). In an embodiment, as the bolt 12 is pushed into the housing 1122 and the pressure pads 1194 engage and align with the annular groove 40 of the bolt 12, the pawls 1215 spring back inwardly, and the pressure pads 1194 engage and reside within the annular groove 40 of the bolt 12, resulting in the bolt 12 being captivated (not shown in the Figures).

All such variations and modifications are intended to be included within the scope of the invention as defined in the appended claims.

What is claimed is:

1. A retainer ring, comprising:
    an outer ring having an exterior surface, and an interior surface, and at least one spring beam element extending from the interior surface of the outer ring, wherein the at least one spring beam element includes an elongated arm having a first end attached to the interior surface, a free, second end opposite the first end, and a tab portion formed at the second end, wherein the arm of the at least one spring beam element and the interior surface form a slot therebetween; and
    a centrally-located aperture that is sized and shaped to receive a bolt having an annular groove,
    wherein when the bolt engages the retainer ring, the at least one spring beam element is displaced and expands radially from a free position to an expanded position in order to enable the bolt to travel through the aperture
    and wherein when the retainer ring engages and aligns with the annular groove of the bolt, the at least one spring beam element springs back to its free position in order to captivate the bolt.

2. The retainer ring of claim 1, wherein the at least one spring beam element includes a plurality of spring beam elements.

3. The retainer ring of claim 2, wherein each of the elongated arms of the plurality of spring beam elements is curvilinear in shape.

4. The retainer ring of claim 3, wherein each of the arms is positioned concentrically with the outer ring.

5. The retainer ring of claim 3, wherein each of the arms is positioned eccentrically with the outer ring.

6. The retainer ring of claim 3, wherein the retainer ring is adapted to be installed within a housing, wherein the housing includes an outer wall, an inner wall, and a channel formed between the inner wall and the outer wall, wherein the channel of the housing is sized and shaped to receive the retainer ring such that the exterior surface of the outer ring of the retainer ring is juxtaposed with the outer wall of the housing, and each of the plurality of spring beam elements of the retainer ring is juxtaposed with the inner wall of the housing.

7. The retainer ring of claim 6, wherein the housing includes a plurality of windows formed within the inner wall, wherein each of the plurality of windows includes a stop surface, and wherein each of the plurality of windows of the housing is sized and shaped to receive a corresponding one of the tab portions of the plurality of spring beam elements of the retainer ring.

8. The retainer ring of claim 7, wherein each of the tab portions of the retainer ring includes a pressure pad, wherein when the plurality of spring beam elements are in their expanded positions, each of the pressure pads contacts a corresponding one of the stop surfaces of the housing.

9. The retainer ring of claim 8, wherein each of the pressure pads extends perpendicular to its corresponding arm of one of the plurality of spring beam elements.

10. The retainer ring of claim 9, wherein each of the tab portions extends substantially perpendicular to and in the same plane as the free end of its corresponding arm of one of the plurality of spring beam elements.

11. The retainer ring of claim 10, wherein each of the arms of the spring beam elements includes a hook member formed at the first end thereof, wherein the outer wall of the housing includes a plurality of tabs, and wherein each of the hook members engages a corresponding one of the tabs of the housing.

12. The retainer ring of claim 11, wherein the at least one spring beam element includes a plurality of cantilevered arms, and wherein the plurality of cantilevered arms are separate and distinct elements.

13. The retainer ring of claim 12, wherein each of the plurality of cantilevered arms includes a first end and a second end opposite the first end, wherein the first end includes an engagement member for engaging a bolt, and the second end includes a hook member for engaging a housing.

14. The retainer ring of claim 13, wherein each of the cantilevered arms is curvilinear in shape.

* * * * *